United States Patent
Sayyarodsari et al.

(10) Patent No.: US 12,105,507 B2
(45) Date of Patent: Oct. 1, 2024

(54) AUTOMATED DIAGNOSIS OF AUGMENTED ACOUSTIC MEASUREMENT IN INDUSTRIAL ENVIRONMENTS

(71) Applicant: ROCKWELL AUTOMATION TECHNOLOGIES, INC., Mayfield Heights, OH (US)

(72) Inventors: Bijan Sayyarodsari, Austin, TX (US); Kadir Liano, Pflugerville, TX (US); Wei Dai, Austin, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 21 days.

(21) Appl. No.: 17/463,159

(22) Filed: Aug. 31, 2021

(65) Prior Publication Data

US 2023/0061688 A1    Mar. 2, 2023

(51) Int. Cl.
*G05B 23/02*    (2006.01)
*G05B 19/418*    (2006.01)

(52) U.S. Cl.
CPC ..... *G05B 23/0281* (2013.01); *G05B 19/4183* (2013.01); *G05B 19/4184* (2013.01);
(Continued)

(58) Field of Classification Search
CPC .............. G05B 23/024; G05B 23/0221; G05B 23/0254; G05B 20/0281; G05B 19/4183; G05B 19/4184; G05B 23/0218; G05B 2219/37337; G05B 23/0275; G05B 19/418; G05B 2219/37434; G05B 2219/37435; G05B 23/0235; G05B 23/0283;
(Continued)

(56) References Cited

U.S. PATENT DOCUMENTS 6,772,633 B2    8/2004  Terry et al.
10,394,227 B2   8/2019  Michalscheck et al.
(Continued)

OTHER PUBLICATIONS

Ruo-Yu Yang and Rahul Rai, "Machine auscultation: enabling machine diagnostics using convolutional neural networks and large-scale machine audio data", Advances in Manufacturing, May 2019, pp. 174-187, vol. 7.

(Continued)

*Primary Examiner* — Yoshihisa Ishizuka
*Assistant Examiner* — Carter W Ferrell
(74) *Attorney, Agent, or Firm* — Fletcher Yoder, P.C.

(57) ABSTRACT

A computer-readable medium may include instructions that may cause a processor to perform operations that may include receiving audio data representative of sound waves generated by industrial devices and extracting features from the audio data. The features may be representative of a portion of the audio data. The operations may also include identifying a subset of the features based on distances between each of the plurality of features in an information space. The information space may include known clusters. The operations may then include determining that the subset of the features corresponds to an unknown cluster in the information space, performing a constrained classification operation based on each feature of the subset of the features to identify a new known cluster for the information space, and modifying operations of the industrial devices based on the new known cluster.

18 Claims, 4 Drawing Sheets

(52) U.S. Cl.
CPC ..... *G05B 23/0218* (2013.01); *G05B 23/0289* (2013.01); *G05B 23/024* (2013.01); *G05B 2219/37337* (2013.01)

(58) Field of Classification Search
CPC .............. G05B 23/026; G05B 23/0289; G05B 20/0291; G05B 23/0294; G05B 23/027; G05B 19/37434; G01H 17/00; G01H 1/006; G01H 1/003; G01H 1/00; G01H 1/04; G01H 1/06; G01H 1/08; G01M 13/028; G01M 13/045; G01M 99/00; G06K 9/6218; G06K 9/00523
See application file for complete search history.

(56) References Cited

U.S. PATENT DOCUMENTS

| | | | | |
|---|---|---|---|---|
| 11,256,759 | B1* | 2/2022 | Chen | ............ G06F 16/9024 |
| 2007/0088550 | A1* | 4/2007 | Filev | ............ G05B 23/0221 |
| | | | | 704/245 |
| 2016/0147187 | A1* | 5/2016 | Muramoto | ......... G03G 15/5062 |
| | | | | 399/9 |
| 2018/0239345 | A1* | 8/2018 | Noda | ............ G05B 23/0283 |
| 2020/0026262 | A1* | 1/2020 | Otsu | ............ G06K 9/6218 |
| 2021/0148791 | A1* | 5/2021 | Huang | ............ B25J 9/1674 |
| 2022/0051051 | A1* | 2/2022 | Kehrer | ............ G06T 7/0004 |

OTHER PUBLICATIONS

Adam Glowacz, "Acoustic-Based Fault Diagnostics of Commutator Motor," MDPI, Nov. 2018, 21 Pages, Electronics, 2018, 7, 299.
Coltraco, "Portagauge® 5—New Handheld Ultrasonic Multiple Echo Thickness Gauge," Nov. 29, 2021, 1 Page, https://coltraco.com/watch-our-brand-new-video-for-our-portagauge-5/.

* cited by examiner

AUTOMATED DIAGNOSIS OF AUGMENTED ACOUSTIC MEASUREMENT IN INDUSTRIAL ENVIRONMENTS

BACKGROUND

The present disclosure generally relates to control systems and, more particularly, to control systems performing non-intrusive monitoring and diagnostics in industrial automation environments with electromechanical machinery, production lines, conveyer systems, and the like.

Generally, a control system may facilitate performance of an industrial automation process by controlling operation of one or more automation devices. For example, to facilitate performing an industrial automation process, the control system may determine a control action and instruct an automation device (e.g., a rod-pump) to perform the control action. Additionally, the control system may monitor performance of the process to determine whether the process is operating as desired. When not operating as desired, the control system may also perform diagnostic operations on the process to determine potential causes of the undesired operation.

In some instances, the control system may utilize acoustic or sound data to monitor operations of various equipment employed to perform the industrial process. That is, the use of sound waves created by machine/line/unit operation may be used as a non-intrusive mechanism for performance monitoring. However, analyzing the acquired sound waves in real time using limited processing resources of computing devices positioned within the industrial environment may be a challenge.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a non-transitory computer-readable medium may include computer-executable instructions that, when executed, may cause a processor to perform operations that may include receiving audio data representative of a plurality of sound waves generated by one or more industrial devices and extracting a plurality of features from the audio data. The plurality of features may be representative of a portion of the audio data. The operations may also include identifying a subset of the plurality of features based on one or more distances between each of the plurality of features in an information space. The information space may include a plurality of known clusters. The operations may then include determining that the subset of the plurality of features corresponds to an unknown cluster in the information space, performing a constrained classification operation based on each feature of the subset of the plurality of features to identify a new known cluster for the information space, and modifying one or more operations of the one or more industrial devices based on the new known cluster. The constrained classification operation may preserve the plurality of known clusters from alteration.

In another embodiment, a method may include receiving, via at least one processor, audio data representative of a plurality of sound waves generated by one or more industrial devices. The method may also include extracting a plurality of features from the audio data, such that the plurality of features is representative of a portion of the audio data. The method may also involve identifying a subset of the plurality of features based on one or more distances between each of the plurality of features in an information space, such that the information space may include a plurality of known clusters. The method may then involve determining that the subset of the plurality of features corresponds to an unknown cluster in the information space and performing a constrained classification operation based on each feature of the subset of the plurality of features to identify a new known cluster for the information space. The constrained classification operation may be configured to preserve the plurality of known clusters from alteration. The method may then include modifying one or more operations of the one or more industrial devices based on the new known cluster.

In yet another embodiment, a sensor device may include an audio sensor that may acquire audio data and a processor that may perform operations include receiving audio data representative of a plurality of sound waves generated by one or more industrial devices. The operations may then include extracting a plurality of features from the audio data, such that the plurality of features is representative of a portion of the audio data. The operations may then involve identifying a subset of the plurality of features based on one or more distances between each of the plurality of features in an information space, such that the information space comprises a plurality of known clusters. The operations may then include determining that the subset of the plurality of features corresponds to an unknown cluster in the information space and performing a constrained classification operation based on each feature of the subset of the plurality of features to identify a new known cluster for the information space. The constrained classification operation may be configured to preserve the plurality of known clusters from alteration. The operations may also include modifying one or more operations of the one or more industrial devices based on the new known cluster.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
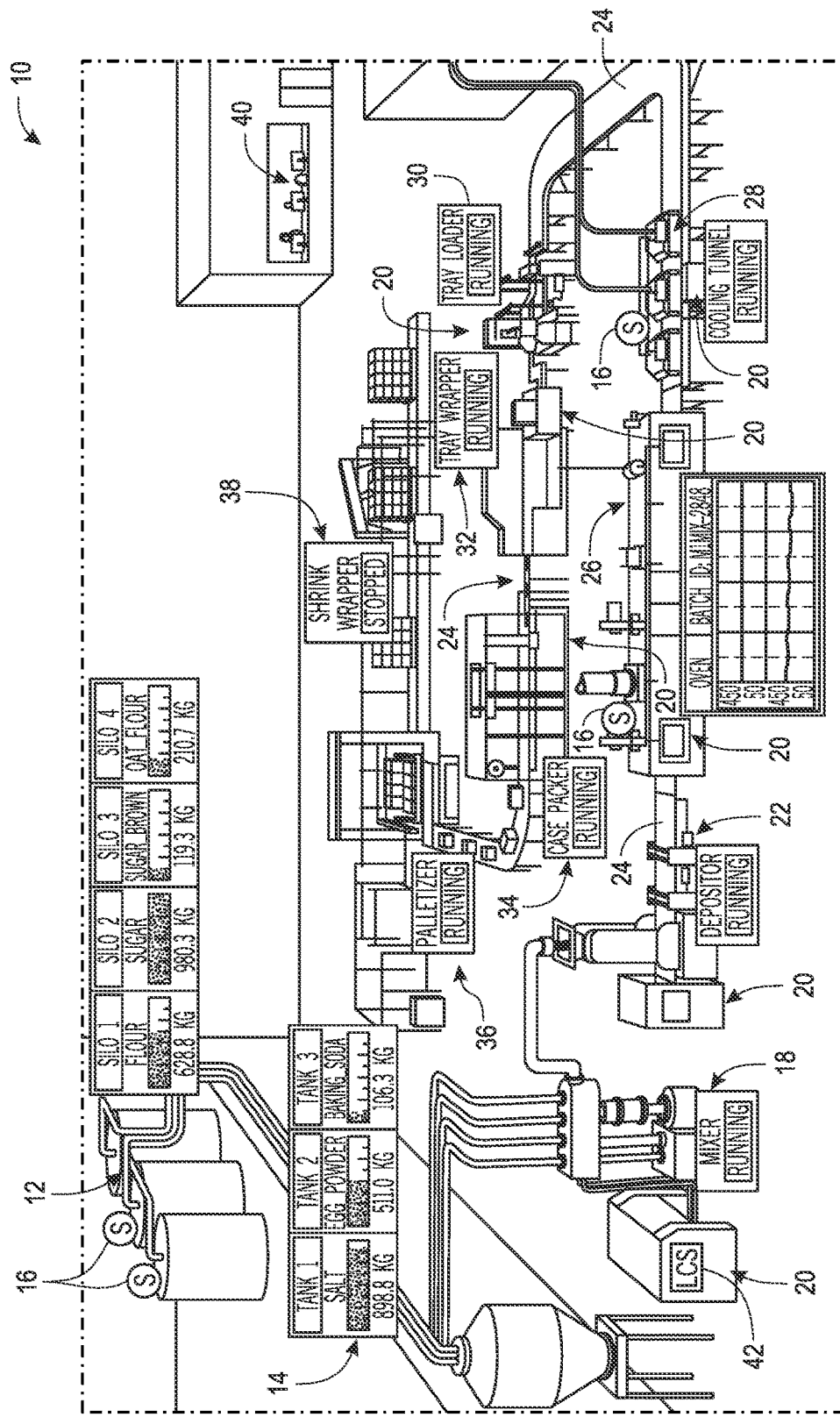
FIG. 1 illustrates an example industrial automation system employed by a food manufacturer, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed above, audio or acoustic data acquired by audio or sound sensors may be used to monitor the performance of various industrial equipment or operations being executed by an industrial automation system. Generally, to identify anomalies or problems present in industrial automation equipment based on audio data representative of the operations of the industrial automation equipment, computing systems may perform extensive computational operations on the acquired audio data. For instance, the acquired audio data may be filtered to remove background noise unrelated to the operation of the industrial equipment. The filtered data may be transformed into a different domain (e.g., time domain to frequency domain), such that features of the filtered data may be extracted and compared to baseline model for expected sound profiles of the operation of the industrial equipment.

Keeping the foregoing in mind, computing devices tasked with evaluating the sound profile data associated with the operation of a vast number of industrial components may prove to be challenging and may involve complex processing algorithms and techniques that cause the computing device to consume more processing power, operate with reduced speeds, or the like. In some embodiments as described herein, processing components may be integrated with acoustic or audio sensors to perform an audio analysis of acquired audio data. However, since the processing components integrated with the audio sensors may have a smaller form factor and fewer computational resources than larger computing devices, these processing components may have relatively less processing capabilities as compared to the processing capabilities of the computing devices described above.

Regardless of the processing capabilities of the processing components, it may be beneficial to employ improved systems and methods for reliably discerning a state of operation of for a piece of industrial equipment, a collection of industrial equipment, a process being performed by an industrial automation system, or the like based on audio data alone. Indeed, to reliably discern a state of operation from acoustic signals alone, extensive domain expert input may be useful to identify certain states of operations. With this in mind, at times, even with input from a domain expert, the acoustic signal alone is not sufficient for reliable detection of a presence of an anomaly within the audio data. Moreover, when employing a closed-loop audio analysis operation, a fixed pre-trained baseline model that may be used for identifying anomalies in the audio data may not accurately identify anomalies during run time (e.g., during the real-time operation of the industrial equipment). That is, due to the limited amount of time to perform the analysis, the closed-loop audio analysis operation may not have a sufficient amount of time to perform the analysis or receive inputs from domain experts to update the pre-trained baseline model. Accordingly, the present disclosure includes embodiments that implement online or real-time updates to audio baseline models used for identifying anomalies in audio data that may be indicative of a problem or undesired operational state of industrial equipment.

By way of example, an audio sensor may acquire audio data related to sound produced my industrial equipment. The audio sensor may include a processor that may receive the audio data. Although the processor may include limited processing capabilities and may be coupled to limited storage components, it still may be capable of perform certain processing operations on the received audio signal to assess whether the industrial equipment is operating as expected. That is, in some embodiments, the processor may receive other sensor measurements (e.g., temperature, current, vibration) from other sensing devices, along with the audio data. The processor may then employ a feature generation engine (FGE) to extract various features from the audio data and the other collected data. The extracted features may include a portion of the collected data to enable the processor to analyze less data as compared to the raw collected data.

After extracting the features, the processor may use a stream clustering engine to determine how the extracted features may differentiate between various operations conditions of the industrial equipment. That is, the stream clustering engine may group extracted features having similar values together into a respective cluster. Each resulting cluster of extracted features may correspond to a respective operating condition (e.g., normal, over-heating) of the industrial equipment. The stream clustering engine may receive the extracted features in real time and determine whether they fit within existing cluster or whether they represent a new undefined cluster. In some embodiments, the stream clustering engine may analyze the features extracted from the collection of sensor data (e.g., audio data, temperature data, vibration data) to determine a minimal set of features that offer a maximum amount of separation between clusters that are eventually associated with the extracted features. In other words, if the extracted features from the collected data include a subset of extracted features that allow the stream cluster engine to assign the extracted features more quickly to a particular cluster, the stream clustering engine may preserve knowledge of the subset of features to evaluate in the future during streaming analysis to more efficiently identify a respective cluster.

In some embodiments, the stream clustering engine may request input from a domain expert to characterize the extracted features into a respective cluster or identify a new cluster and respective operating condition. The stream clustering engine may then work to identify the subset of extracted features that correspond to the features that provide a maximum distance from other clusters within a feature space.

The subset of features may be provided to a cluster matching engine that may include a library of features or collections of features and a matching to a respective cluster. The cluster matching engine may thus allow the processor to receive extracted feature for current streaming data, compare the streaming data's features to known clusters, and identify a match to a respective cluster in real time.

In the instance that a new cluster is identified by the cluster matching engine or the stream clustering engine, the processor may send the respective extracted features to a constrained classification engine. The constrained classification engine is constrained by preventing a reclassification or re-clustering of previously identified clusters. That is, as classification or clustering algorithms use training data to identify and establish a number of clusters, the training data may not be stored in limited storage components accessible to the processor. As such, when new feature data is received that may cause a new cluster to be formed, it may be useful to prevent a classification engine from retraining the cluster matching engine using the new feature data. Instead, a constrained classification engine may use the unmatched extracted feature data to identify a new cluster or as training data for the cluster.

Based on the extracted features and the identified clusters, the processor may use an early warning engine to determine whether the monitored industrial equipment is trending towards a known anomalous condition or state. That is, as extracted feature data is mapped to an informational space, the trend of the extracted feature data may be used to predict that the equipment will be in an anomalous condition state within some amount of time.

By employing the techniques described herein, sensor devices may be equipped to process and analyze acquired sensor data in an efficient manner, while reducing the amount of processing time and processing power by respective processing components. That is, although processing capabilities of processing components continue to increase over time, the amount of data accessible or acquirable by sensor devices continue to increase. As such, to glean useful and actionable insight from the data acquired by sensing devices, it may be useful to employ improved methods for analyzing data acquired by the sensor devices to provide efficient operations for industrial equipment. Additional details with regard to efficiently monitoring audio data to perform diagnostic operations in real time using sensor devices will be described below with reference to FIGS. 1-5.

By way of introduction, FIG. 1 illustrates an example industrial automation system 10 employed by a food manufacturer. The present embodiments described herein may be implemented using the various devices illustrated in the industrial automation system 10 described below. However, it should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like. In addition, the sensors 16 may measure or acquire image data, audio data, and other suitable ambient characteristics surrounding the industrial automation system 10.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

With the foregoing in mind, the supervisory control system 40, the local control system 42, and other suitable control systems may employ nonintrusive monitoring and diagnostics operation for the industrial automation devices 20 (e.g., electromechanical machinery, production lines, conveyer systems), where failure in a unit interrupts the operation, thereby resulting in significant negative financial impact on a business. For instance, in certain embodiments, use of audio data that captures the sound produced by a single industrial automation device 20 (e.g., machine) or a collection of industrial automation devices 20 (e.g., line) is an attractive option for performance monitoring, as recording machine noise is non-intrusive and operational sound includes discernible attributes that may be used to identify abnormal behavior.

Figure 2:
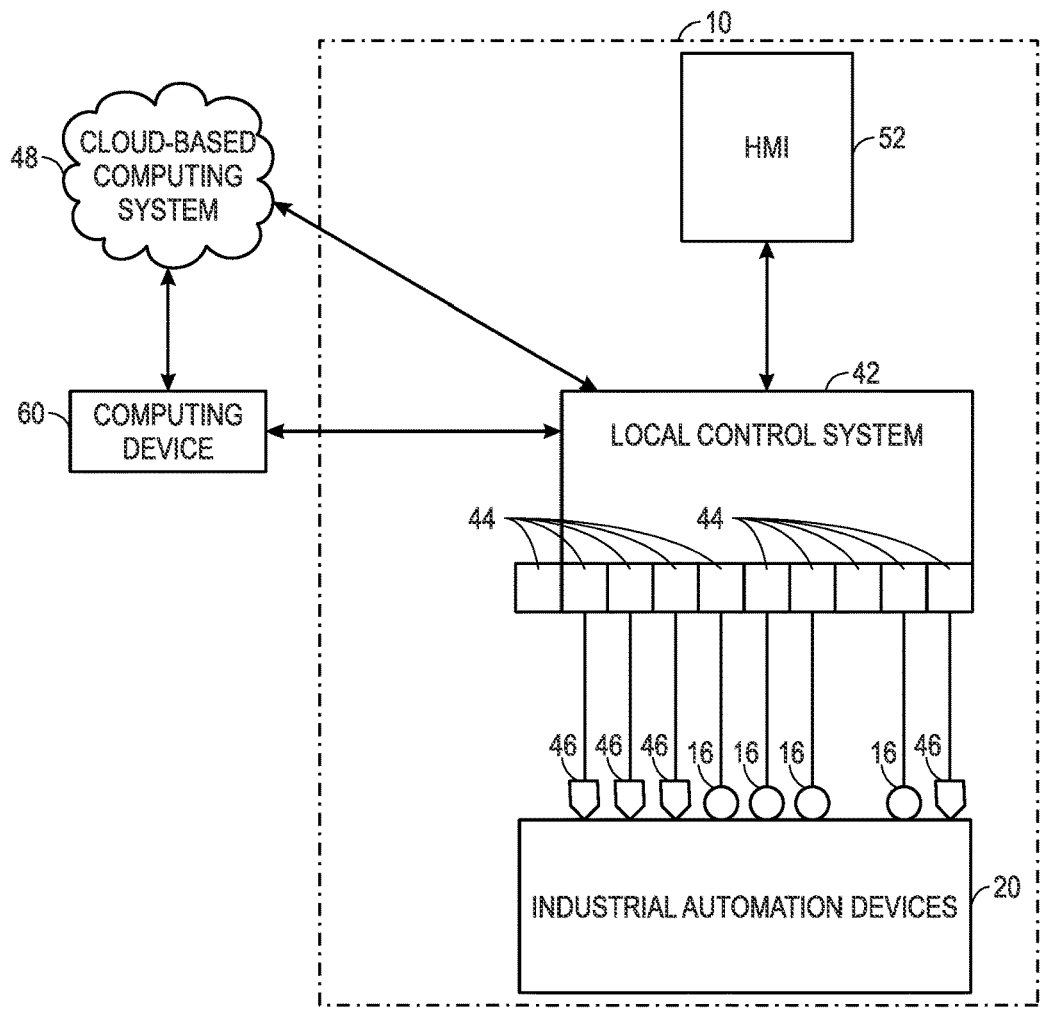
FIG. 2 illustrates a diagrammatical representation of an exemplary control and monitoring system that may be employed in any suitable industrial automation system, in accordance with an embodiment.

By way of example, FIG. 2 illustrates a diagrammatical representation of an exemplary local control system 42 that may be employed in any suitable industrial automation system 10, in accordance with embodiments presented herein. In FIG. 2, the local control system 42 is illustrated being communicatively coupled to a human machine interface (HMI) 52. The local control system 42 may include a control/monitoring device or automation controller adapted to interface with the industrial automation devices 20 or other components that may monitor and control various types of the industrial automation devices 20. By way of example, the industrial automation devices 20 (industrial automation equipment) may include the mixer 18, the depositor 22, the conveyor 24, the oven 26, other pieces of machinery described in FIG. 1, or any other suitable equipment.

It should be noted that the local control system 42, the supervisory control system 40, or any other suitable processing component, in accordance with embodiments of the present techniques, may communicate with other components via certain network strategies. Indeed, any suitable industry standard network or network may be employed, such as DeviceNet, to enable data transfer. Such networks permit the exchange of data in accordance with a predefined protocol and may provide power for operation of networked elements.

In certain embodiments, the local control system 42 may include a communication component that enables the industrial automation devices 20 to communicate data between each other and other devices. The communication component may include a network interface that may enable the industrial automation equipment 50 to communicate via various protocols such as Ethernet/IP®, ControlNet®, DeviceNet®, or any other industrial communication network protocol. Alternatively, the communication component may enable the industrial automation devices 20 to communicate via various wired or wireless communication protocols, such as Wi-Fi, mobile telecommunications technology (e.g., 2G, 3G, 4G, LTE), Bluetooth®, near-field communications technology, and the like.

As discussed above, the industrial automation devices 20 may take many forms and include devices for accomplishing many different and varied purposes. For example, the industrial automation devices 20 may include machinery used to perform various operations in a compressor station, an oil refinery, a batch operation for making food items, a mechanized assembly line, and so forth. Accordingly, the industrial automation devices 20 may include a variety of operational components, such as electric motors, valves, actuators, temperature elements, pressure sensors, or a myriad of machinery or devices used for manufacturing, processing, material handling, and other applications.

Additionally, the industrial automation devices 20 may include various types of equipment that may be used to perform the various operations that may be part of an industrial application. For instance, the industrial automation devices 20 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation devices 20, which may include controllers, input/output (I/O) modules, motor control centers, motors, human machine interfaces (HMIs), operator interfaces, contactors, starters, sensors 16, actuators, drives, relays, protection devices, switchgear, compressors, firewall, network switches (e.g., Ethernet switches, modular-managed, fixed-managed, service-router, industrial, unmanaged, etc.), and the like.

In some cases, the industrial automation devices 20 may be associated with devices used by other equipment. For instance, scanners, gauges, valves, flow meters, and the like may be disposed on the industrial automation devices 20. Here, the industrial automation devices 20 may receive data from the associated devices and use the data to perform their respective operations more efficiently. For example, a controller of a motor drive may receive data regarding a temperature of a connected motor and may adjust operations of the motor drive based on the data.

Input/output (I/O) modules 44 may be added or removed from the local control system 42 via expansion slots, bays, or other suitable mechanisms. In certain embodiments, the I/O modules 44 may be included to add functionality to the local control system 42, or to accommodate additional process features. For instance, the I/O modules 44 may communicate with new sensors 16 or actuators 46 added to local control system 42. It should be noted that the I/O modules 44 may communicate directly to sensors 16 or actuators 46 through hardwired connections or may communicate through wired or wireless sensor networks, such as Hart or IOLink.

Generally, the I/O modules 44 serve as an electrical interface to the local control system 42 and may be located proximate or remote from a control/monitoring device coupled to the industrial automation device 20, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE702.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 44 may transfer input and output signals between the local control system 42 and the industrial automation devices 20. As illustrated, the sensors 16 and actuators 46 may communicate with the local control system 42 via one or more of the I/O modules 44.

In certain embodiments, one or more properties of the industrial automation devices 20 may be monitored and controlled by certain equipment for regulating control variables used to operate the industrial automation devices 20. For example, the sensors 16 may monitor various properties of the industrial automation devices 20 and may provide data to the local control system 42, which may adjust operations of the industrial automation equipment 50, respectively.

The sensors 16 may be any number of devices adapted to provide information regarding process conditions. The actuators 46 may include any number of devices adapted to perform a mechanical action in response to a signal from a controller (e.g., the local control system 42). The sensors 16 and actuators 46 may be utilized to operate the industrial automation devices 20. Indeed, they may be utilized within process loops that are monitored and controlled by the local control system 42. Such a process loop may be activated based on process input data (e.g., input from a sensor 16) or direct operator input received through the HMI 52.

In certain embodiments, the industrial automation system 10 may make up an industrial automation application that may involve any type of industrial process or system used to manufacture, produce, process, or package various types of items. For example, the industrial applications may include industries such as material handling, packaging industries, manufacturing, processing, batch processing, the example industrial automation system 10 of FIG. 1, and the like.

In certain embodiments, the local control system 42 may be communicatively coupled to a computing device 60 and a cloud-based computing system 48. In this network, input and output signals generated from the local control system 42 may be communicated between the computing device 60 and the cloud-based computing system 48. Although the local control system 42 may be capable of communicating with the computing device 60 and the cloud-based computing system 48, as mentioned above, in certain embodiments, local control system 42 may perform certain operations and analysis without sending data to the computing device 60 or the cloud-based computing system 48.

In operation, the industrial automation system 10 may receive one or more inputs used to produce one or more outputs. For example, the inputs may include feedstock, electrical energy, fuel, parts, assemblies, sub-assemblies, operational parameters (e.g., sensor measurements), or any combination thereof. Additionally, the outputs may include finished products, semi-finished products, assemblies, manufacturing products, by products, or any combination thereof.

To produce the one or more outputs used to control the industrial automation devices 20, the local control system 42 may output control signals to instruct industrial automation devices 20 to perform a control action by implementing manipulated variable set points. For example, the local control system 42 may instruct a motor (e.g., an automation device 20) to implement a control action by actuating at a particular operating speed (e.g., a manipulated variable set point).

In some embodiments, the local control system 42 may determine the manipulated variable set points based at least in part on process data. As described above, the process data may be indicative of operation of the industrial automation device 20 and the like. As such, the process data may include operational parameters of the industrial automation device 20. For example, the operational parameters may include any suitable type, such as temperature, flow rate, electrical power, and the like.

Thus, the local control system 42 may receive process data from one or more of the industrial automation devices 20, the sensors 16, or the like. In some embodiments, the sensor 16 may determine an operational parameter and communicate a measurement signal indicating the operational parameter to the local control system 42. For example, a temperature sensor may measure temperature of a motor (e.g., an automation device 20) and transmit a measurement signal indicating the measured temperature to the local control system 42. The local control system 42 may then analyze the process data to monitor performance of the industrial automation application (e.g., determine an expected operational state) and/or perform diagnostics on the industrial automation application.

To facilitate controlling operation and/or performing other functions, the local control system 42 may include one or more controllers, such as one or more model predictive control (MPC) controllers, one or more proportional-integral-derivative (PID) controllers, one or more neural network controllers, one or more fuzzy logic controllers, or any combination thereof.

In some embodiments, the supervisory control system 40 may provide centralized control over operation of the industrial automation application. For example, the supervisory control system 40 may enable centralized communication with a user (e.g., operator). To facilitate, the supervisory control system 40 may include the display 86 to facilitate providing information to the user. For example, the display 86 may display visual representations of information, such as process data, selected features, expected operational parameters, and/or relationships there between. Additionally, the supervisory control system 40 may include other components as described below On the other hand, the local control system 42 may provide localized control over a portion of the industrial automation application. For example, in the depicted embodiment of FIG. 1, the local control system 42 that may be part of the mixer 18 may include the local control system 42, which may provide control over operation of a first automation device 20 that controls the mixer 18, while a second local control system 42 may provide control over operation of a second automation device 20 that controls the operation of the depositor 22.

In some embodiments, the local control system 42 may control operation of a portion of the industrial automation application based at least in part on the control strategy determined by the supervisory control system 40. Additionally, the supervisory control system 40 may determine the control strategy based at least in part on process data determined by the local control system 42. Thus, to implement the control strategy, the supervisory control system 40 and the local control systems 42 may be communicatively coupled via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

Figure 3:
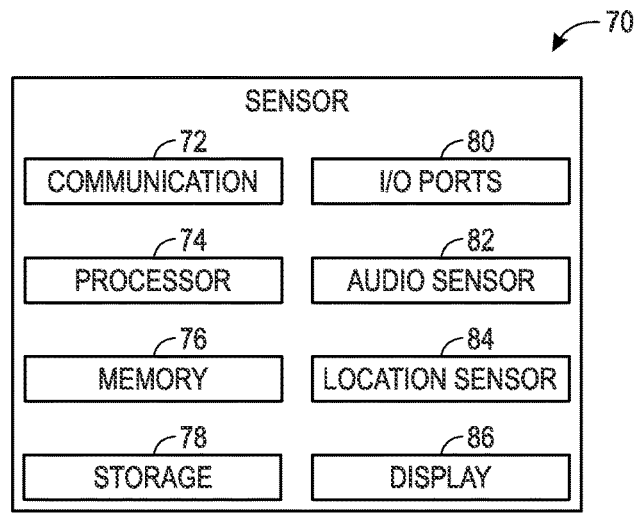
FIG. 3 illustrates example components that may be part of a control/monitoring device in a control system for the industrial automation system, in accordance with an embodiment.

In some embodiments, the sensors 16 may include various types of sensors for detecting various types of data. By way of example, the sensors 16 described herein may include audio sensors that detect acoustic or sound waves. FIG. 3 illustrates example components that may be part of the sensor 16. However, it should be noted that the local control system 42, the supervisor control system 40, or any other suitable computing device may include the components described as being part of the sensor 16. Referring to FIG. 3, the sensor 16 may include a communication component 72, a processor 74, a memory 76, a storage 78, input/output (I/O) ports 80, an audio sensor 82 (e.g., a microphone), a location sensor 84, a display 86, additional sensors (e.g., vibration sensors, temperature sensors), and the like. The communication component 72 may be a wireless or wired communication component that may facilitate communication between the industrial automation devices 20, the cloud-based computing system 48, and other communication capable devices.

The processor 74 may be any type of computer processor or microprocessor capable of executing computer-executable code. The processor 74 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 74 may execute software applications that include programs that enable a user to track and/or monitor operations of the industrial automation devices 20 via a local or remote communication link. That is, the software applications may communicate with the local control system 42 and gather information associated with the industrial automation devices based on data acquired by the audio sensor 82.

The memory 76 and the storage 78 may also be used to store the data, analysis of the data, the software applications, and the like. The memory 76 and the storage 78 may represent non-transitory computer-readable media (e.g., any suitable form of memory or storage) that may store the processor-executable code used by the processor 74 to perform various techniques described herein. It should be noted that non-transitory merely indicates that the media is tangible and not a signal.

In one embodiment, the memory 76 and/or storage 78 may include a software application that may be executed by the processor 74 and may be used to monitor, control, access, or view one of the industrial automation devices 20. As such, the sensor 16 may communicatively couple to the industrial automation devices 20 or to a respective computing device via a direct connection between the devices or via the cloud-based computing system 48. The software application may perform various functionalities, such as track statistics of the industrial automation devices 20, determine operating states for the industrial automation devices 20, determine whether industrial automation devices 20 are operating in an anomalous state, and so forth.

The I/O ports 80 may be interfaces that may couple to other peripheral components such as input devices (e.g., keyboard, mouse), sensors, input/output (I/O) modules, and the like. I/O modules may also enable the sensor 16 to interface with the computing device 60 or other control/monitoring devices to communicate with the industrial automation devices 20 or other devices in the industrial automation system via the I/O modules 44.

The audio sensor 82 may include any suitable acoustic acquisition circuitry such as a microphone capable of acquiring sound waves, acoustic signals, or the like. The location sensor 84 may include circuitry designed to determine a physical location of the sensor 16. In one embodiment, the location sensor 84 may include a global positioning system (GPS) sensor that acquires GPS coordinates for the sensor 16.

The display 86 may depict visualizations associated with software or executable code being processed by the processor 74. In one embodiment, the display 86 may be a touch display capable of receiving inputs (e.g., parameter data for operating the industrial automation equipment 50) from a user. As such, the display 86 may serve as a user interface to communicate with the sensor 16. The display 86 may display a graphical user interface (GUI) for operating the sensor 16. The display 86 may be any suitable type of display, such as a liquid crystal display (LCD), plasma display, or an organic light emitting diode (OLED) display, for example.

Although the components described above have been discussed with regard to the sensor 16 and the local control system 42, it should be noted that similar components may make up other computing devices described herein. Further, it should be noted that the listed components are provided as example components and the embodiments described herein are not to be limited to the components described with reference to FIG. 3.

With the foregoing in mind, it should be noted that the processor 74 of the sensor 16 may have limited processing capabilities and storage capacity due to the size or form factor of the sensor 16. That is, the sensor 16 may be designed to be positioned on or between various industrial automation devices 20. In some embodiments, the processor 74 may receive other sensor measurements from other sensors that are part of the sensor 16 or part of other sensors 16. In any case, the present embodiments described herein provide an efficient method in which the processor 74 of the sensor 16 may efficiently analyze audio data to assess an operational state of one or more industrial automation devices 20, a portion of the industrial system 10, the entire industrial automation system 10, or the like.

Before continuing, it should be noted that although the audio data may include properties that may assist in identifying anomalies and abnormal behavior, audio or sound/acoustic-based monitoring and diagnostics operations may include significant challenges that prevent them from being employed in various systems. For instance, the industrial automation system 10 may be in an environment in which background noise may corrupt or inhibit a certain level of signal processing that may allow for informative sound (e.g., discernable properties) to be captured sufficiently to enable a processing component or computing device to associate the acquired audio data to an operational state.

To reliably discern a state of operation from audio data, domain expert input may be received to confirm or train the processing component to identify the appropriate operational state that corresponds to the industrial automation devices 20. However, at times, even with input from a domain expert, the audio data may not be sufficient for reliable detection of anomalies or accurately detecting an operational state.

Moreover, performing the analysis on the audio data to glean operational states may involve a threshold amount of processing power and capabilities (e.g., random-access memory (RAM), cache, operating frequency, thermal design, clock rate). As such, improved systems and methods for analyzing audio data to discern operational states of industrial automation devices 20 and collections of industrial automation devices 20 are desirable.

In some embodiments, the sensor 16 may include processing components that may analyze audio data collected by the audio sensor 82 and determine whether the industrial automation devices 20 contributing to the audio data is operating in an anomalous state. That is, the industrial automation devices 20 may operate in various states or conditions that correspond to expected operations or unexpected-anomalous conditions. To efficiently (e.g., using minimal computing resources) and effectively (e.g., accuracy above some threshold percentage) determine the operational state in which the respective industrial automation devices 20 are operating, the processor 74 of the sensor 16 may employ certain processing blocks or modules to reduce an amount of audio data it evaluates to accurately assess an operating condition of the respective industrial automation device(s) 20. Additional details regarding the various processing modules employed by the audio sensor device will be described below with reference to FIG. 4.

Figure 4:
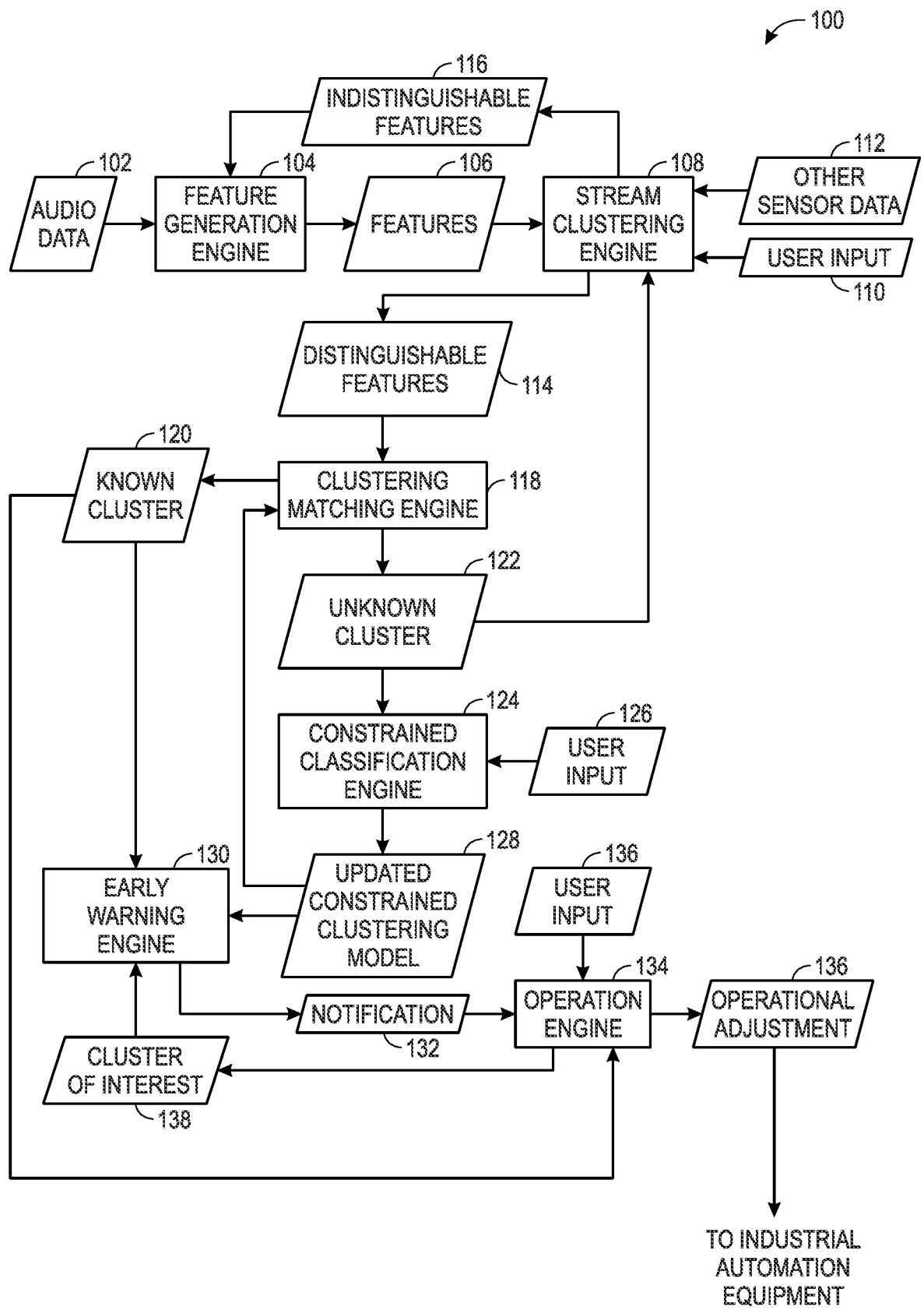
FIG. 4 illustrates a data flow chart of a method for updating a constrained clustering model for audio data acquired within an industrial environment, in accordance with an embodiment.

Referring now to FIG. 4, a data flow diagram of a process 100 is illustrated to detail a manner in which audio data acquired by the audio sensor 82 is analyzed to determine whether industrial automation devices 20 or at least a portion of the industrial automation system 10 is operating in an expected state or an anomalous state. As used herein, an anomalous state may correspond to unexpected states of operation in which one or more industrial automation devices 20 are operating inefficiently, ineffectively, or the like. The anomalous states may be indicative of a problem in the respective devices that may correspond to a wear condition, a need for maintenance, a likelihood of a fault or stop in operation, or the like.

The process 100 details a number of processing blocks or modules that the processor 74 may employ to perform the various tasks described herein. Each of the processing blocks may be implemented by the processor 74 using software code, hardware components, or the like. By performing different processing operations using different processing blocks, module, or portions of code, the processor 74 may efficiently perform different analysis operations that collectively work together to effectively identify operational states of industrial automation devices 20 using audio data. Moreover, by employing the processing blocks described in FIG. 4, the processor 74 may implement a set of rules and procedures that, when performed in the sequence described herein, enable the processor 74 to provide improved interpretation and analysis of audio data for determining operational states of industrial automation devices 20 or the industrial automation system 10.

Before continuing, the following description of the process 100 will be described as being performed by the processor 74 of the sensor 16 described in FIG. 3. However, it should be noted that the process 100 may be performed by other sensor devices that receives raw sensor data related to operations of an industrial automation device 20. Indeed, the process 100 may be performed using computing devices having more processing capabilities than the sensor 16, but the increased processing capabilities may allow the computing device to consider more data and determine more accurate results. As such, it should be noted that the embodiments described below are especially useful when using processing components with limited processing capabilities and storage access. For instance, one example of the type of processing component that may correspond to the processor 74 may include a microcontroller that is limited to having a 16 Kbyte instruction and/or data cache, 512 Kbytes of Static Random-Access Memory (SRAM), a 32-bit data bus, 2 Mbytes of Flash memory, and the like. Although Referring now to FIG. 4, the processor 74 may first receive audio data 102 acquired by the audio sensor 82. The audio data 102 may include a collection of sound waves representative of noise, vibration, or sound present in an area. The sensor 16 may be placed in a number of locations within the industrial automation system 10 to obtain sets of audio data related to different areas within the industrial automation system 10. For example, the sensors 16 may be placed on or adjacent to an industrial automation device 20, such as a motor that operates according to a routine schedule. As such, the audio data associated with the operation of the motor may directly correspond to the operational states of the motor. For instance, as the motor slows down, the audio data may include sound waves with lower amplitude values as compared to the motor's previous speed.

Since the audio data 102 is acquired in an industrial environment, sources of noise may reduce a signal-to-noise ratio that corresponds to the audio or sound waves produced by the industrial automation devices 20. That is, industrial environments may include a variety of audio sources that may be unrelated to the operations of the equipment therein. Noise related to traffic conditions outside the industrial automation system 10, conversations spoken by personnel within the environment, and other sources of noise may reduce the ability of the processor 74 from accurately discerning differences in audio samples related to the operation of the industrial automation devices 20.

With this in mind, the processor 74 may provide the audio data 102 to a feature generation engine 104. The feature generation engine 104 may extract various features from the recorded sound measurement. That is, the feature generation engine 104 may process the audio data 102 to extract certain details associated with the audio data 102 that represent the operational states of the industrial automation devices 20 surrounding the sensor 16. By way of example, the feature generation engine 104 may include low pass or band pass filtering operations, where the filter parameters may be defined based on an application or operational states of interest. For example, the industrial automation devices 20 may produce vibrations that correspond to sounds within a certain frequency range. The filtering operations may remove portions of the audio data 102 that fall outside the desired range.

The feature generation engine 104 may also perform sampling operations, such that the sampling frequency may be determined based on an expected frequency of the monitored signal. Using the example provided above, the industrial automation device 20 may perform certain mechanical tasks (e.g., closing) in a periodic fashion. The sampling frequency may be selected to match the periodic timing of the mechanical tasks.

The feature generation engine 104 may also perform pre-emphasis filtering operations to remove certain undesired signals from the audio signal. For instance, by using a high pass finite impulse response (FIR) filter, the feature generation engine 104 may cope with a spectral tilt (e.g., loss of power at higher frequencies) that may be present in the audio data.

Additionally, the feature generation engine 104 may extract portions or features of the audio data 102 by transforming the audio data 102 into different domains. For example, the feature generation engine 104 may generate or identify features in the audio data from a frequency domain (e.g., a Fourier transform of the signal), a time domain (e.g., using kernel (base pattern) functions to extract time-domain patterns), time-frequency domain (e.g., various types of spectrogram analysis), and the like.

After extracting features 106 using the feature generation engine 104, the processor 74 may send the features 106 to a stream clustering engine 108 to determine how the features 106 generated by the feature generation engine 104 can maximally differentiate variations in operation conditions captured by the audio data 102. That is, during a training period, the stream clustering engine 108 may receive the features 106 and map the features into an information space. For instance, different data points of the features 106 may be plotted on the multi-dimensional graph that represents an information space. The information space may map the features 106 to form a space that represents operational states mapped to principal or highly influential components of audio data 102.

Figure 5:
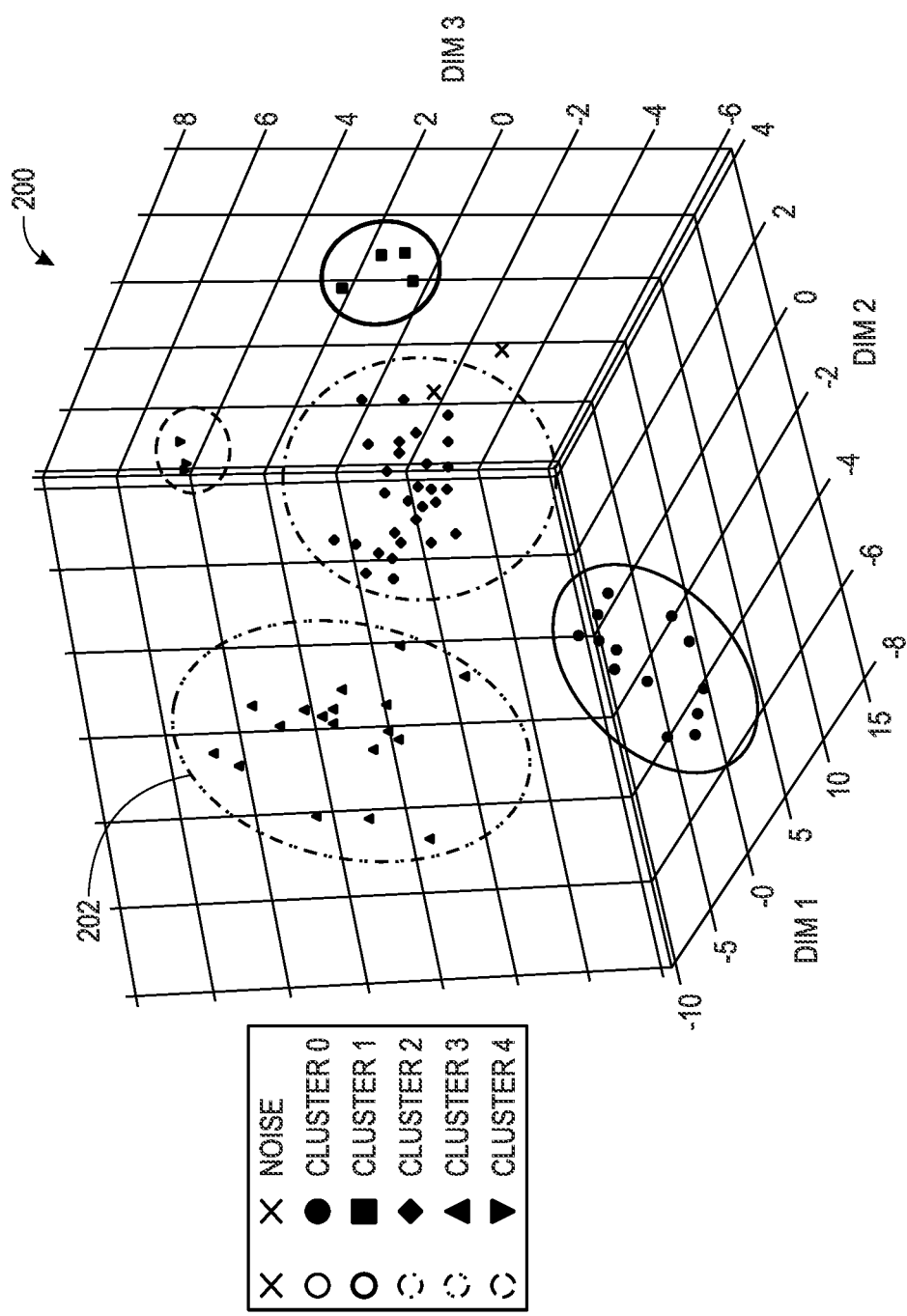
FIG. 5 illustrates an example mapping of feature data in an information space, in accordance with an embodiment.

By way of example, FIG. 5 illustrates an example informational space or multi-dimensional graph 200 that includes features 106 mapped according to different dimensions. The dimensions may correspond to any suitable parameter such as time, value, or any other sensor data acquired by other sensors. In certain embodiments, the multi-dimensional graph 200 may be presented via the display 86, such that operation personnel may provide input with regard to labels for identified clusters. With this in mind, in some embodiments, when a new data point is received, the processor 74 may receive user input 110 to classify a group of data points that corresponds to a portion of the features 106 as a cluster 202. The cluster 202 may correspond to an operational state of the industrial automation system 10, the industrial automation devices 20, or the like.

The user input 110 may include context or information (e.g., operational state data) related to the new data point to assist the processor 74 to classify received data points to certain operational states. As such, based on the user input 110, the processor 74 may associate operational state data for the respective industrial automation device 20, the respective industrial automation equipment, or the respective portion of the industrial automation system 10 to a distinct cluster.

Referring back to the stream clustering engine 108, in some embodiments, the stream clustering engine 108 may detect changes in operating conditions of the respective industrial automation devices 20 based on the features 106 and the user input 110. As mentioned above, the user input 110 may include input from a domain expert (e.g., in the form of label on the recorded sound) and may be used to inform the stream clustering engine 108 of notable changes in the operation condition.

Additionally, the stream clustering engine 108 may receive other available measurements or other sensor data 112 that can also be used to inform the stream clustering engine 108 of notable changes in the operating condition. The other sensor data 112 may be received from other sensors 16 that measure different properties other than audio. For example, the other sensor data 112 may include temperature or a current data that corresponds to an operational state.

In any case, after the stream clustering engine 108 identifies suitable clusters 202 that correspond to certain operational conditions of the monitored industrial automation devices 20, the stream clustering engine 108 may perform an explicit search in the information space to identify a subset of the features 106 that offer a threshold amount of separation (e.g., distance between features in the information space) between different clusters or operating conditions. In other words, the stream clustering engine 108 may determine a minimal set of features that can offer a maximal separation between different operating conditions. The subset of features is output by the stream clustering engine 108 as distinguishable features 114.

If the stream clustering engine 108 determines that the features 106 do not include a subset of features that greater than the threshold amount of separation between clusters, the stream clustering engine 108 may return indistinguishable features 116 to the feature generation engine 104. That is, the stream clustering engine 108 may inform the feature generation engine 104 when the features 106 output by the feature generation engine 104 are not sufficient to clearly distinguish notable operating conditions.

After receiving the indistinguishable features 116 or an indication of the indistinguishable features, the feature generation engine 104 may initiate an additional feature generation process in response to the stream clustering engine's 108 feedback. In some embodiments, the indistinguishable features 116 may include feedback that may guide the feature generation engine 104 to optimize the computational cost of feature generation for the application at hand. That is, the feedback may specify a subset of the features 106 that do not contribute to the stream clustering engine's 108 performance (e.g., identification of respective cluster for detected features), and the feature generation engine 104 may modify the filters employed by the feature generation engine 104, such that the previously identified features 106 may not be identified to prevent similar types of features from being provided as the features 106. As a result, the feature generation engine 104 may generate a different set of features 106 that may better differentiate between operational states of the respective industrial automation devices 20.

In any case, after the stream clustering engine 108 identifies the distinguishable features 114, the processor 74 may provide the distinguishable features 114 to a clustering matching engine 118. The clustering matching engine 118 may detect whether a newly recorded operating condition matches against previously observed operation conditions. That is, the clustering matching engine 118 may create a library of certain characteristics or signatures that corresponds to a subset of the distinguishable features 114 that may be categorized into a known cluster.

As such, the clustering matching engine 118 may receive the distinguishable features 114 and compare a group of the distinguishable features 114 to the signatures or properties for known clusters 120. The known clusters 120 may be defined in an information space over time, provided to the clustering matching engine 118 by a user, or the like. In some embodiments, the clustering matching engine 118 may determine a probability of match between each feature of the distinguishable features 114 against each known signature that corresponds to a known cluster 120. The clustering matching engine 118 may report the result of the comparison in any suitable format to the user of the processor 74, to a storage component, the cloud-based computing system 48, the computing device 60, the local control system 42, or the like.

In some embodiments, the processor 74 may present a number of the distinguishable features 114 that have probability value that is greater than some threshold (e.g., 75%) via the HMI 52, the display 86, or other suitable electronic display. In some embodiments, the cluster matching engine 118 may automatically classify a particular feature of the distinguishable features 114 into a known cluster 120 in response to the feature having more than a threshold percentage (e.g., 95%) match with the signature.

In some embodiments, the processor 74 may automatically perform certain operational adjustments to the industrial automation devices 20 in response to the distinguishable features 114 matching one of the known clusters 120. That is, certain operational states that correspond to particular known clusters 120 may be associated with undesired states of operation. As such, upon detecting of the respective industrial automation devices 20 operating in these states, the processor 74 may automatically perform certain operational adjustments (e.g., slow down, power off) to ensure that the industrial system 10 continues to operate and to minimize an amount of wear that the respective industrial automation devices 20 may experience. In some embodiments, the processor 74 may send a notification to the computing device 60, the local control system 42, or other communication-enabled device to notify personnel of a request for maintenance related to the the identified operation state along with the confidence in the said detection.

Referring back to the clustering matching engine 118, if the clustering matching engine 118 does not identify a match between one or more of the distinguishable features 114 to known operating condition signatures, the clustering matching engine 118 may label the current feature set as unknown state and associate the distinguishable features 114 as an unknown cluster 122. In some embodiments, the clustering matching engine 118 may forward the unknown clusters 122 to the stream clustering engine 108 to reevaluate the related distinguishable features 114. That is, the stream clustering engine 108 may determine whether the distinguishable features 114 that correspond to the unknown cluster 122 relate to a transient noise or a lasting new operation state.

Additionally, the unknown cluster 122 may be provided to a constrained classification engine 124. The constrained classification engine 124 may preserve the mapping between distinguishable features 114 and known clusters 120, while incorporating the subset of distinguishable features 114 that map to unknown clusters 122 into existing domain knowledge. That is, the identification or detection of unknown clusters 122 may correspond to an event for the constrained classification engine 124. In other systems, the detection of this type of event may cause a classification engine 124 to retrain itself to determine whether the unknown clusters 122 should correspond to known clusters 120. Indeed, retraining or updating a model representative of the known clusters 120 may result in the creation of new known clusters that may alter the identification of previously distinguishable features. That is, previous features identified as part of a first cluster may be identified as part of a second different cluster after retraining is performed based on all of the available data.

Additionally, as mentioned above, the processor 74 of the sensor 16 may have limited processing capabilities and storage capabilities. As such, the processor 74 may not have access to the data used to train and generate the known clusters 120 because the data may be deleted from the storage components of the sensor 16 to preserve storage space for processing real time data. Indeed, existing classification algorithms do not guarantee the preservation of previously identified classes as new data becomes available, especially if the original training data is not retained due to limited memory.

With this in mind, the constrained classification engine 124 may preserve the known clusters 120 and refrain from modifying any classification algorithms associated therewith. Instead, the constrained classification engine 124 may use a batch classification learning mode to maximize the separation of labeled classes with the entire available data. In other words, the subset of distinguishable features 114 that (e.g., only, solely) correspond to the unknown clusters 122 may be evaluated with a classification algorithm that may determine whether each of the subset of distinguishable features 114 has a threshold percentage of matching features to be classified as a cluster. The constrained classification engine 124 may also receive user input 126 that provides domain expert input as to whether the newly grouped cluster corresponds to a particular operational condition.

Based on the classification algorithm, the user input 126, and other related information, the constrained classification engine 124 may generate an updated constrained clustering model 128 that includes newly identified clusters. The updated constrained clustering model 128 may be provided to the clustering matching engine 118 to update its classification algorithms to match data previously attributed to unknown clusters 122 to known clusters 120 defined by the updated constrained clustering model 128. That is, the updated clustering model 128 may include new known clusters that are to be added to the known clusters 120. As discussed above, the previously used classification algorithms that generated the known clusters 120 may continue to identify the same clusters from the distinguishable features 114. However, the clustering matching engine 118 may also identify new known clusters 120 based on the subset of distinguishable features that were part of the unknown clusters 122. As a result, the constrained classification engine 124 may continue to identity and train known clusters 120 based on streaming data received as the audio data 102.

In some embodiments, the updated constrained clustering model 128 and the known clusters 120 may be provided to an early warning engine 130. The early warning engine 130 may provide an advanced notice for an impending problem. For example, as the known clusters 120 or the newly classified clusters deviates from a normal or expected operating condition (e.g., beyond a certain acceptable tolerance level), the early warning engine 130 may produce an alert or generate a notification to indicate the detected change to an operator.

In more complex cases, where different anomalous conditions are already identified, the early warning engine 130 may map the evolution of the operation state, as tracked by the mapping of the distinguishable features 114, into the information space. The early warning engine 130 may determine an accumulative distance measure for the state trajectory to a known cluster that may correspond to an anomalous condition as a function of time (e.g., time scale appropriately selected). The early warning engine 130 may use a rate of change in distance to the known anomalous state to predict the state in which the monitored industrial automation devices 20 may be in an amount of time. The early warning engine 130 may use user-defined thresholds to provide alarm notifications 132 to the computing device 60, the local control system 42, or other suitable communication-enabled components. The notification 132 may provide a warning related to the industrial automation devices 20 being in an anomalous condition within a certain amount of time (e.g., 8 hours). The notification 132 may also provide a probability or confidence value (e.g., 75% probability) based on the trajectory of the mapped distinguishable features 114.

In some embodiments, the early warning engine 130 may send the notification to an operation engine 134 that may present the notification 132 via a display, a graphical interface, or the like. The operation engine 134 may receive user input 136 that indicates states, clusters, or classes that should be monitored for early warning. The user input 135 may also specify an amount of time prior to the monitored industrial automation devices 20 being in the anomalous operation state that the early warning engine 130 should provide the notification 132.

By way of example, the user input 136 may be received via a graphical user interface in which an operator adds an icon or visual marker on a visualization of ellipsoids in the information space indicating the clusters of interest 138 (e.g., ellipsoids signify different classes in an information space). The clusters with the visual marker may then be defined as a target for early warning engine 130. In some embodiments, the early warning engine 130 may then trigger historization of the raw data corresponding to the trajectory that ended with alarm generation. That is, the early warning engine 130 may track and store the raw audio data that correspond to the trajectory and the early warning engine 130 or some other computing module may identify features that represent the trajectory. The processor 74 may perform the process 100 described above with respect to the trajectory to anticipate when the monitored industrial automation devices 20 may move into a particular operational state.

Referring back to the operation engine 134, in some embodiments, the operation engine 134 may determine operational adjustments 138 based on the notifications 132. The operational adjustments 138 may be determined based on the operational states of the monitored industrial automation devices 20. That is, if the monitored industrial automation devices 20 are in an anomalous operational state, the operation engine 134 may determine operational adjustments 138 to cause the monitored industrial automation devices 20 to move to a desired operational state or to reduce the likelihood of the monitored industrial automation devices 20 from being placed offline. For example, the operational adjustments 138 may include commands to drives to cause motors to slow their rotational speeds, temperatures of boilers to reduce, and the like. In this way, the operational adjustments 138 may allow the industrial automation system 10 to remain operational as the monitored industrial automation devices 20 age, wear, or become less efficient.

Although the embodiments described herein are detailed as being performed by the sensor 16, it should be noted the process 100 may be performed by any suitable computing device to minimize storage use and processing power. Indeed, the process 100 may be deployed at the edge (e.g., on the unit operation where sensory data is captured), on a compute surface that aggregates measurements from several sensors (e.g., either at the edge or remote), on a server at the plant level where many more sensory data are brought together, at the cloud level, and the like. In some embodiments, the process 100 may be implemented using containers (e.g., that are part of container orchestration system) that are identically deployed on various platforms.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein.

The invention claimed is:

1. A non-transitory computer-readable medium comprising computer-executable instructions that, when executed, are configured to cause a processor to perform operations comprising:

receiving audio data representative of a plurality of sound waves generated by one or more industrial devices, wherein the audio data is acquired by one or more audio sensors disposed in an industrial environment having the one or more industrial devices;

extracting a plurality of features from the audio data, wherein the plurality of features is representative of a portion of the audio data;

identifying a first subset of the plurality of features based on one or more distances between each of the plurality of features in an information space and each known cluster of a plurality of known clusters in the information space exceeding a respective threshold distance, wherein each known cluster corresponds to a mapping between a respective set of known features and the information space, wherein the first subset of the plurality of features corresponds to an unknown cluster outside of the plurality of known clusters, and wherein each feature of a second subset of the plurality of features corresponds to at least one of the plurality of known clusters, and wherein at least one feature of a third subset of the plurality of features is outside of each of the plurality of known clusters and has an additional distance from each of the plurality of known clusters in the information space that is less than the respective threshold distance;

performing a constrained classification operation on each feature of the first subset of the plurality of features based on a constrained clustering model, wherein the constrained classification operation is configured to analyze each feature of the first subset of the plurality of features separately from the plurality of known features using a batch classification learning mode, and wherein analyzing each feature of the first subset of the plurality of features using the batch classification learning mode comprises designating at least a portion of the first subset of the plurality of features as a new cluster based on each feature of the at least a portion of the first subset of the plurality of features having a threshold percentage of matching features;

updating the constrained clustering model based on the at least a portion of the first subset of the plurality of features and the second subset of the plurality of features, while excluding the third subset of the plurality of features, wherein the updated constrained clustering model is configured to:

add the new cluster to the plurality of known clusters; and update the mapping to map the at least a portion of the first subset of the plurality of features to the new cluster; and sending one or more commands to the one or more industrial devices to modify one or more operations of the one or more industrial devices based on the new cluster.

2. The non-transitory computer-readable medium of claim 1, wherein the plurality of sound waves corresponds to noise, vibration, or sound present in an area having the one or more industrial devices.

3. The non-transitory computer-readable medium of claim 1, wherein the plurality of features is extracted via one or more filters, one or more samples, one or more transformation operations, or any combination thereof.

4. The non-transitory computer-readable medium of claim 1, wherein the computer-executable instructions that, when executed, are configured to cause the processor to perform the operations comprising:
receiving user input for classifying one or more features of the first subset of the plurality of features as a change in operational state of the one or more industrial devices; and
associating the one or more features with one of the plurality of known clusters in response to receiving the input.

5. The non-transitory computer-readable medium of claim 1, wherein the constrained classification operation is configured to add the new cluster to the plurality of known clusters based solely on each feature of the at least a portion of the first subset of the plurality of features and ignoring each feature of the third subset of the plurality of features.

6. The non-transitory computer-readable medium of claim 1, wherein the computer-executable instructions that, when executed, are configured to cause the processor to perform the operations comprising:
tracking an additional subset of the plurality of features;
determining that the additional subset of the plurality of features is indicative of the one or more industrial devices is trending towards being associated with one of the plurality of known clusters within a period of time; and
sending a notification to a computing device in response to determining that the additional subset of the plurality of features is indicative of the one or more industrial devices trending towards being associated with the one of the plurality of known clusters within the period of time.

7. A method, comprising:
receiving, via at least one processor, audio data representative of a plurality of sound waves generated by one or more industrial devices, wherein the audio data is acquired by one or more audio sensors disposed in an industrial environment having the one or more industrial devices;
extracting, via the at least one processor, a plurality of features from the audio data, wherein the plurality of features is representative of a portion of the audio data;
identifying, via the at least one processor, a first subset of the plurality of features based on one or more distances between each of the plurality of features in an information space and each known cluster of a plurality of known clusters in the information space exceeding a respective threshold distance, each known cluster corresponding to a mapping between a respective set of known features and the information space, wherein the first subset of the plurality of features corresponds to an unknown cluster outside of the plurality of known clusters, and wherein each feature of a second subset of the plurality of features corresponds to at least one known cluster of the plurality of known clusters, and wherein at least one feature of a third subset of the plurality of features is outside of each of the plurality of known clusters and has an additional distance from each of the plurality of known clusters in the information space that is less than the respective threshold distance;
performing, via the at least one processor, a constrained classification operation on each feature of the first subset of the plurality of features based on a constrained clustering model, wherein the constrained classification operation is configured to analyze each feature of the first subset of the plurality of features separately from the plurality of known features using a batch classification learning mode, and wherein analyzing each feature of the first subset of the plurality of features using the batch classification learning mode comprises designating at least a portion of the first subset of the plurality of features as a new cluster based on each feature of the at least a portion of the first subset of the plurality of features having a threshold percentage of matching features; and
updating the constrained clustering model based on the at least a portion of the first subset of the plurality of features and the second subset of the plurality of features, while excluding the third subset of the plurality of features wherein the updated constrained clustering model is configured to:
add the new cluster to the plurality of known clusters; and
update the mapping to map the at least a portion of the first subset of the plurality of features to the new cluster; and
sending, via the at least one processor, one or more commands to the one or more industrial devices to adjust one or more operations of the one or more industrial devices based on the new cluster.

8. The method of claim 7, comprising extracting an additional plurality of features from the audio data in response to the one or more distances between each of the plurality of features in the information space being greater than a threshold, wherein the additional plurality of features is representative of a different portion of the audio data as compared to the portion.

9. The method of claim 7, wherein each of the plurality of known clusters corresponds to a respective operational state of the one or more industrial devices.

10. The method of claim 7, comprising:
determining that the first subset of the plurality of features corresponds to one of the plurality of known clusters; and
sending a notification to a computing device indicative of an operational state that corresponds to the one of the plurality of known clusters.

11. The method of claim 7, wherein the one or more operations of the one or more industrial devices are modified to cause the one or more industrial devices to operate in an operational state that corresponds to one of the plurality of known clusters.

12. The method of claim 7, comprising:
receiving an indication that the unknown cluster corresponds to an anomalous state; and
determining the one or more commands to adjust the one or more operations of the one or more industrial devices based on the anomalous state.

13. The method of claim 7, comprising:
receiving sensor data from one or more sensors; and
identifying the first subset of the plurality of features based on the one or more distances between each of the plurality of features in the information space and the sensor data.

14. A sensor device, comprising:
an audio sensor configured to acquire audio data; and
a processor configured to perform operations comprising:
receiving audio data representative of a plurality of sound waves generated by one or more industrial devices, wherein the audio data is acquired by one or more audio sensors disposed in an industrial environment having the one or more industrial devices;
extracting a plurality of features from the audio data, wherein the plurality of features is representative of a portion of the audio data;
identifying a first subset of the plurality of features based on one or more distances between each of the plurality of features in an information space and each known cluster of a plurality of known clusters in the information space exceeding a respective threshold distance, each known cluster corresponding to a mapping of at least one of a plurality of known features and the information space, wherein the first subset of the plurality of features corresponds to an unknown cluster outside of the plurality of known clusters, and wherein each feature of a second subset of the plurality of features corresponds to at least one known cluster of the plurality of known clusters, and wherein at least one feature of a third subset of the plurality of features is outside of each of the plurality of known clusters and has an additional distance from each of the plurality of known clusters in the information space that is less than the respective threshold distance;
performing a constrained classification operation on each feature of the first subset of the plurality of features based on a constrained clustering model, wherein the constrained classification operation is configured to analyze each feature of the first subset of the plurality of features separately from the plurality of known features using a batch classification learning mode, and wherein analyzing each feature of the first subset of the plurality of features using the batch classification learning mode comprises designating at least a portion of the first subset of the plurality of features as a new cluster based on each feature of the at least a portion of the first subset of the plurality of features having a threshold percentage of matching features;
updating the constrained clustering model based on the at least a portion of the first subset of the plurality of features and the second subset of the plurality of features, while excluding the third subset of the plurality of features, wherein the updated constrained clustering model is configured to:
add the new cluster to the plurality of known clusters; and
update the mapping to map the at least a portion of the first subset of the plurality of features to the new cluster; and
sending one or more commands to one or more industrial devices to adjust one or more operations of the one or more industrial devices based on the new cluster.

15. The sensor device of claim 14, wherein the one or more industrial devices comprise one or more actuators, one or more drives, one or more protection devices, one or more compressors, or any combination thereof.

16. The sensor device of claim 14, wherein the audio data corresponds to noise, vibration, or sound present in an area having the one or more industrial devices.

17. The sensor device of claim 14, wherein the constrained classification operation is configured to add the new cluster to the plurality of known clusters based only on each feature of the at least a portion of the first subset of the plurality of features.

18. The sensor device of claim 14, wherein the processor is configured to perform the operations comprising:
tracking an additional subset of the plurality of features;
determining that the additional subset of the plurality of features is indicative of the one or more industrial devices is trending towards being associated with one of the plurality of known clusters within a period of time; and
sending a notification to a computing device in response to determining that the additional subset of the plurality of features is indicative of the one or more industrial devices trending towards being associated with the one of the plurality of known clusters within the period of time.

* * * * *